Feb. 11, 1941.  A. E. DRISSNER  2,231,000
LEAD SCREW ADJUSTING MEANS
Filed Feb. 23, 1938    2 Sheets-Sheet 1

Inventor
Alfred E. Drissner
by his Attorney

Feb. 11, 1941.  A. E. DRISSNER  2,231,000
LEAD SCREW ADJUSTING MEANS
Filed Feb. 23, 1938  2 Sheets—Sheet 2
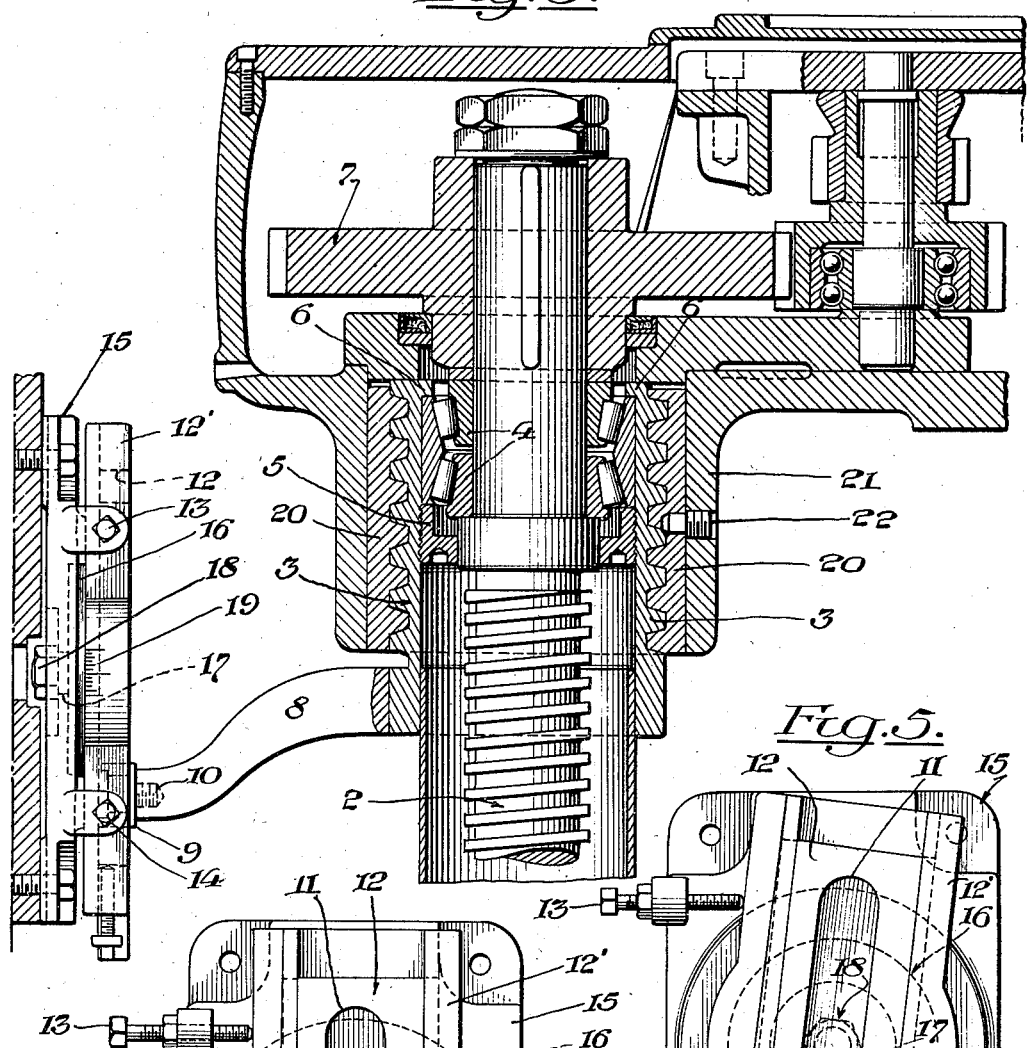
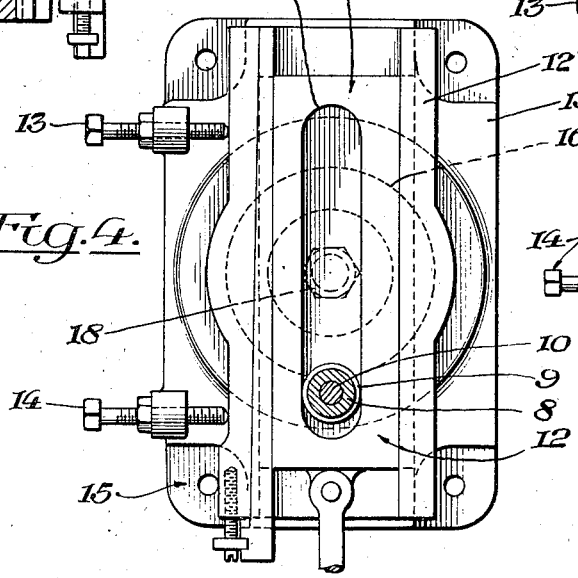
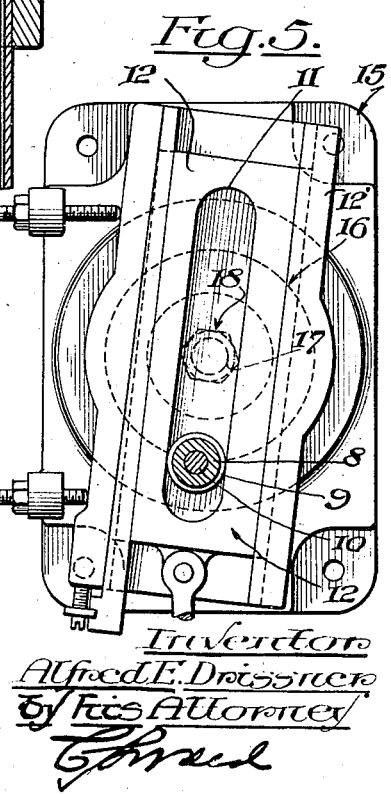

Patented Feb. 11, 1941

2,231,000

UNITED STATES PATENT OFFICE 2,231,000

LEAD SCREW ADJUSTING MEANS

Alfred E. Drissner, Cleveland, Ohio, assignor to The National Acme Company, Cleveland, Ohio, a corporation of Ohio Application February 23, 1938, Serial No. 192,017

9 Claims. (Cl. 82—5)

This invention relates to lead screws used in various types of machines to guide and control the movement of the slide carrying the threading or similar tools and has for its principal object the provision of means for automatically adjusting the lead screw in a simple, efficient and inexpensive manner.

Heretofore, in threading tools and the like, wherein a lead screw was used for feeding the tool or the work, the accuracy of the work depended upon the accuracy with which the lead screw was cut so that it was essential in grinding a lead screw that it be 100% perfect or errors would result in the thread produced on the work.

In some cases, due to the heat of the work during the threading, even though a lead screw might be accurate, an error would result in the work due to the change in temperature from the beginning to the end of the work. It is, therefore, one of the objects of this invention to provide means for adjusting the lead screw for any inaccuracies due either to incorrectness in the grinding of the lead screw or to compensate for the expansion of the work due to heat during the cutting operation, which adjustment will be gradual and effective over a particular portion or the entire work as desired.

Other objects and advantages will appear in the following description.

In the drawings accompanying and forming a part of this specification, Fig. 1 is a plan view illustrating the lead screw adjustment controlling means in section.

Fig. 3 is an enlarged sectional view of one end of the lead screw and its adjusting means.

Fig. 4 is a plan view of the adjustment controlling means, and

Fig. 5 is a similar view illustrating one form of adjustment of the controlling means.

Similar characters of reference indicate corresponding parts in the several views.

Figure 1:
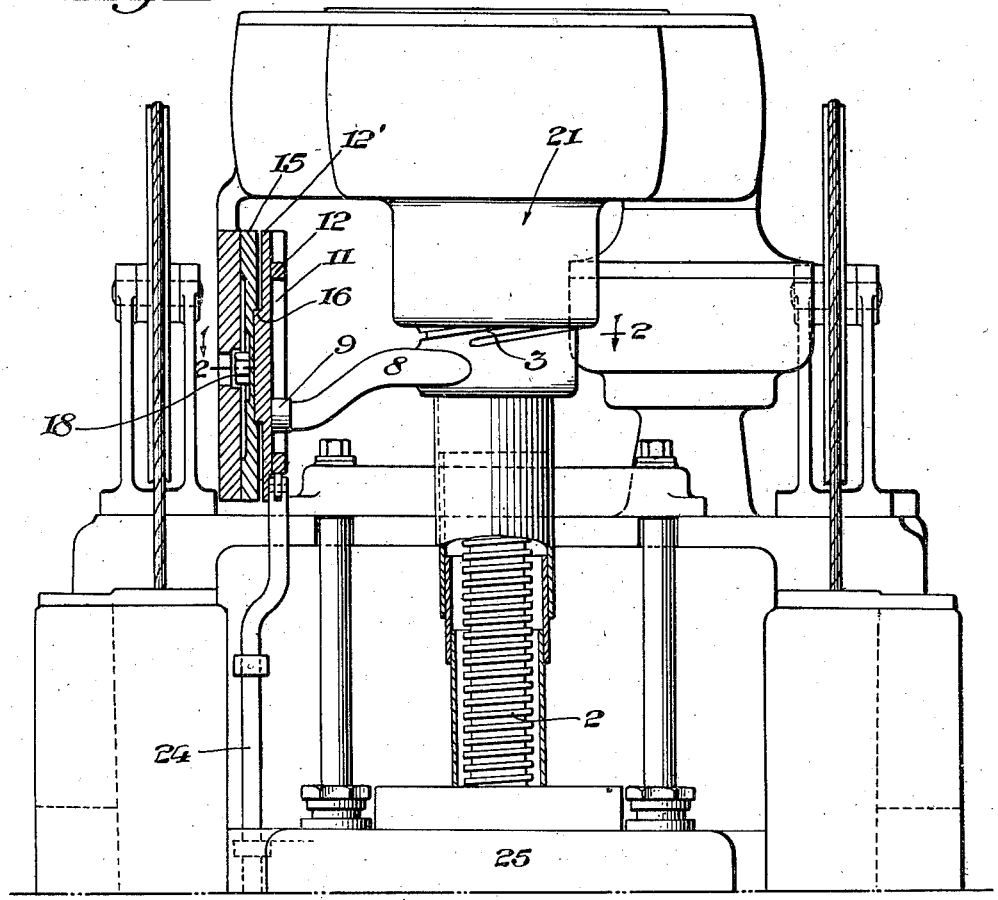
Figure 2:
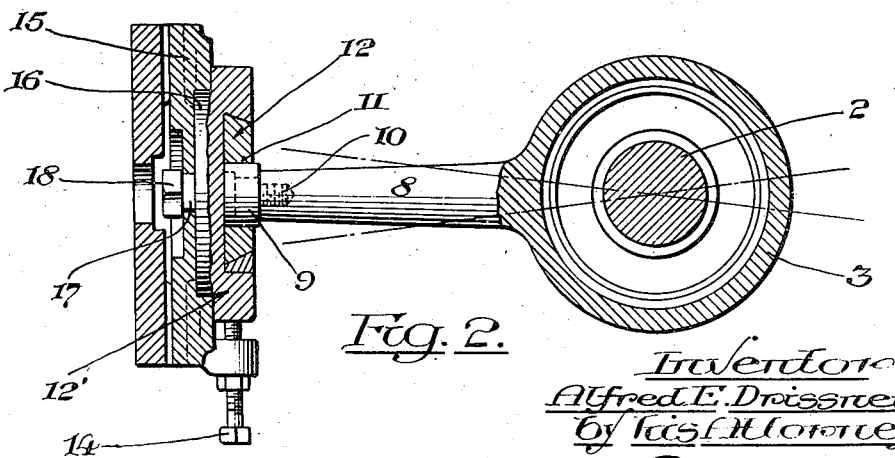
Fig. 2 is a sectional view taken on the line 2—2 of Fig. 1.

Before explaining in detail the present improvement and mode of operation thereof, I desire to have it understood that the invention is not limited to the details of construction and arrangement of parts which are illustrated in the accompanying drawings since the invention is capable of other embodiments, and that the phraseology employed is for the purpose of description and not of limitation.

Ordinarily, when a lead screw is used in the threading of a bolt or nut where accuracy is required, it is customary to take the threaded article and place it in a projection machine to enlarge the thread perhaps 50 to 100 times so as to permit inspection of the exact lead of that screw and if found to be slightly off which, in many cases is perhaps a matter of but .001", since the lead screw cannot be corrected after installation on the machine because the thread of the lead screw is fixed to the body of the shaft thus forming a single unit and it is, therefore, necessary to remove the lead screw to rethread or regrind it.

Furthermore, a coupling which is used to connect pipes has to fit very accurately in the thread to eliminate leaks under great pressure. For instance, when cutting a diameter of six inches, the length of the thread is approximately three to three and a half inches. The thread is tapered and, therefore, when the coupling is placed in the machine to be threaded, the coupling is cold and when the threading tool cuts the thread in the coupling, it will heat the coupling due to the cutting speed of the tool so that by the time the full length of the thread is cut, the heat of the coupling may be increased from forty to one hundred and twenty degrees. Therefore, it is necessary to take into consideration the coefficient of expansion of the metal to be operated upon in cutting a lead screw since one that might produce perfectly accurate results with one material might produce incorrect results with another.

It is with this in mind that the present invention was devised and it will be seen from the following that the foregoing difficulties are eliminated.

In the present instance, the lead screw 2 of the machine is fixed within a suitable adjusting nut 3 whereby the lead screw may be moved endwise in either direction by a corresponding movement of the adjusting nut 3. The lead screw 2 is suitably secured within this nut 3 against independent endwise or axial movement by means of the lock nut 5 and the shoulder 6 of the adjusting nut 3 but is permitted to rotate freely therein by means of the bearings 4.

Rotation of the lead screw is derived from a gear 7 which is constructed to have a sliding mesh with the usual change gears for different R. P. M. of the lead screw and these gears are driven by the usual driving mechanism which it is not deemed necessary to describe herein.

Thus, it will be seen that instead of the usual means for positioning the lead screw within the frame of the machine, I have devised a means of floatingly securing the lead screw within the frame and fixed it to an axially movable member which is, in the present instance, moved axially by rotation hereinafter described although other means may be provided for axially moving the lead screw without departing from the spirit of the present invention.

The adjusting nut 3, in the present instance, is provided with a suitable arm or extension 8 having a roller or guide block 9 secured thereon by any suitable means such as a pin 10 and this roller is guided in a groove 11 of a guide or cam slide 12 which, in turn, is carried by a bracket 15 secured to the machine.

The cam slide 12 is slidably carried by a suitable member 12' rotatably secured to the bracket 15 by means of a pilot 16 which is held in place by a screw 17 and nut 18. This pilot 16 is provided with micrometer graduations 19 and, together with the cam slide 12, is adjusted by means of suitable adjusting screws 13 and 14.

Adjustment of the slide 12 by means of the adjusting nuts 13 and 14 thus rotates the pilot 16 on its screw pivot 17 to any desired angle of the slide 12 and thereby the cam slot 11 relative to the bracket 15.

The nut 3 meshes with a threaded sleeve 20 held in fixed position on the frame 21 of the machine by means of any suitable holding means such as the screw 22.

When the lead screw 2 rotates, the slide or carrier 25 carrying the tools or work as the case may be is advanced by means of the usual nut engaging the lead screw and this slide 25 is connected, in the present instance, with the cam slide 12 by any suitable means such as the bracket 24 although it might also be connected to the lead screw in the same manner as the slide 25, or in any other way adapted to travel during the operation of the tools on the work. Thus, in the present instance, the cam slide will move with the work or tool slide in the same direction and the same distance.

It will be noted that this adjustment means comprises a train of parts operatively connecting the lead screw with its axially movable holding means for moving the holding means during the operation of the lead screw.

As the cam slide advances the angular setting thereof will cause the roller 9 traveling along the cam slot 11 to rotate the arm 8 and thereby the nut 3. It will be noted that the rotation is gradual and constant due to the shape of the slot 11. This rotation of the nut 3 causes endwise movement thereof relative to the body or frame 21 and since the lead screw is positioned within the frame by means of this nut 3 it will, therefore, be moved axially during the operation of the tools upon the work. In other words, the lead will be retarded or advanced in accordance with the direction of inclination of the cam slide 12 and the advance or retardation will be effective throughout the travel of the carrier. Where no adjustment of the lead screw is desired, the slide 12 may either be set straight or disconnected.

It will be seen that if the lead screw is ground accurately within .001" per foot in lead and it is required that the thread which is to be cut with the threading tool attached to the tool slide and controlled by this lead screw has to be .002" or .003" plus or minus of the lead, this can be accomplished by this automatically adjustable nut 3 since by adjusting the slide 12 as many thousandths of an inch as desired, the lead screw will be advanced or retarded by a forward or backward movement in accordance with this adjustment of the slide 12 and this movement of the lead screw will be gradual and effective throughout the length of the work.

In cases where it might be desired to cut a thread with the lead advanced at the beginning of the work and retarded at the end of the work, this is accomplished by merely changing the shape of the slot 11 in the slide 12. In this case, the slot would be either V-shaped or oval and, similarly, any other variation in lead may be accomplished by a slight variation in the shape of the slot 11 to correspond with the desired change in lead desired.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In a machine, the combination of a floatingly supported lead screw, means for rotating it, a carrier fed by the lead screw and into which said lead screw extends, and means for axially adjusting the lead screw during the feeding of said carrier, said adjusting means constantly increasing the axial movement of said lead screw in a single direction.

2. In a machine, the combination of a floatingly supported lead screw, means for rotating it, a carrier axially movable with and relative to the lead screw by said lead screw, and means for axially adjusting the lead screw during the feeding of said carrier to move the carrier with the lead screw, said adjusting means constantly increasing the axial movement of said lead screw in a single direction.

3. A machine having a lead screw, means for rotating it, a holding member therefor having a threaded connection with a fixed part of said machine, a carrier having a threaded engagement with the lead screw for shifting said carrier axially thereof, a member movable with said carrier, and a connecting member rigidly connected with the holding member and cooperating with the movable member whereby on the movement of said movable member the holding member will be rotated in the machine to shift the lead screw and said carrier axially independently of their threaded engagement.

4. A machine having a rotatable and axially movable member carried by a stationary portion of said machine, a rotatable lead screw carried by said movable member for axial movement therewith and having a floating connection with the machine, a carrier shiftable by and axially relative to said lead screw, a member shiftable with said carrier, and a connecting member rigidly connected with said axially movable member and cooperating with said shiftable member for rotating said axially movable member upon the shifting of the shiftable member to shift the lead screw and carrier axially independently of their relative axial shifting.

5. A machine of the class described having a rotatable and axially movable member carried by a stationary portion of the machine, a rotatable lead screw carried by said movable member for axial movement therewith and having floating connection with the machine, a carrier movable with and relative to said lead screw, means for rotating the lead screw to effect said relative movement of the carrier, a member shiftable with the carrier, and a connecting member rigidly connected with said axially movable member and cooperating with said shiftable member whereby on the movement of the shiftable member the movable member will be rotated to shift the lead screw and carrier axially independently of their relative axial shifting.

6. A machine of the class described having a rotatable and axially movable member carried by a stationary portion of the machine, a rotatable lead screw carried by said movable member for axial movement therewith and having floating connection with the machine, a carrier movable with and relative to said lead screw, means for rotating the lead screw to effect said relative movement of the carrier, a member shiftable with the carrier, and a connecting member rigidly connected with said axially movable member and cooperating with said shiftable member whereby on the movement of the shiftable member the movable member will be rotated to shift the lead screw and carrier axially independently of their relative axial shifting, said shiftable member and connecting member having interlocking cams.

7. A machine of the class described having a rotatable and axially movable member carried by a stationary portion of the machine, a rotatable lead screw carried by said movable member for axial movement therewith and having floating connection with the machine, a carrier movable with and relative to said lead screw, means for rotating the lead screw to effect said relative movement of the carrier, a member shiftable with the carrier, a connecting member rigidly connected with said axially movable member and cooperating with said shiftable member whereby on the movement of the shiftable member the movable member will be rotated to shift the lead screw and carrier axially independently of their relative axial shifting, said shiftable member and connecting member having interlocking cams, and means for adjusting said shiftable member to control the axial movement of said carrier with the lead screw.

8. A machine having a shiftable carrier, a lead screw connected therewith for shifting said carrier relative to the lead screw, shiftable means carried by a stationary part of the machine, said lead screw floatingly supported relative to the machine and carried by said shiftable means, a slide having a cam and movable with the carrier, and a swinging arm cooperating with the cam and with the lead screw through the shiftable means for shifting the lead screw and carrier together.

9. A machine having a shiftable carrier, a lead screw connected therewith for shifting said carrier relative to the lead screw, shiftable means carried by a stationary part of the machine, said lead screw floatingly supported relative to the machine and carried by said shiftable means, an adjustable and pivoted slide having a cam and movable with the carrier, and a swinging arm cooperating with the cam and with the lead screw through the shiftable means for shifting the lead screw and carrier together.

ALFRED E. DRISSNER.